(12) United States Patent
Lyon

(10) Patent No.: US 8,478,755 B2
(45) Date of Patent: Jul. 2, 2013

(54) SORTING LARGE DATA SETS

(75) Inventor: James M. Lyon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1213 days.

(21) Appl. No.: 11/407,783

(22) Filed: Apr. 20, 2006

(65) Prior Publication Data

US 2007/0250664 A1  Oct. 25, 2007

(51) Int. Cl.
*G06F 17/30* (2006.01)

(52) U.S. Cl.
USPC ........... 707/736; 707/741; 707/758; 707/782; 707/917; 707/956

(58) Field of Classification Search
USPC ................. 707/736, 741, 758, 782, 783, 917, 707/956
See application file for complete search history.

(56) References Cited

U.S. PATENT DOCUMENTS

| | | | |
|---|---|---|---|
| 5,193,207 A | 3/1993 | Vander Vegt et al. | |
| 5,901,182 A | 5/1999 | Kot | |
| 6,105,024 A | 8/2000 | Graefe et al. | |
| 6,519,593 B1 | 2/2003 | Matias et al. | |
| 6,732,230 B1 * | 5/2004 | Johnson et al. | 711/114 |
| 6,738,769 B2 | 5/2004 | Sharp | |
| 6,785,786 B1 | 8/2004 | Gold et al. | |
| 6,789,156 B1 | 9/2004 | Waldspurger | |
| 7,245,596 B2 | 7/2007 | Cooley | |
| 7,257,257 B2 | 8/2007 | Anderson | |
| 7,441,092 B2 | 10/2008 | Lyon | |
| 7,447,857 B2 | 11/2008 | Lyon | |
| 7,900,002 B2 | 3/2011 | Lyon | |
| 2003/0212985 A1 | 11/2003 | Chan et al. | |
| 2004/0015478 A1 * | 1/2004 | Pauly | 707/1 |
| 2004/0236803 A1 | 11/2004 | Spiegeleer | |
| 2005/0091460 A1 | 4/2005 | Rotithor et al. | |
| 2005/0108230 A1 * | 5/2005 | Carroll | 707/7 |
| 2005/0251693 A1 | 11/2005 | Shevchenko | |
| 2006/0224846 A1 | 10/2006 | Amarendran | |
| 2006/0230244 A1 | 10/2006 | Amarendran | |
| 2006/0235908 A1 | 10/2006 | Armangau | |
| 2007/0083722 A1 | 4/2007 | Per | |
| 2007/0100913 A1 | 5/2007 | Sumner | |
| 2007/0245119 A1 | 10/2007 | Hoppe | |
| 2007/0250671 A1 | 10/2007 | Lyon | |

(Continued)

OTHER PUBLICATIONS

J.S. Vitter "External memory algorithms and data structures: dealing with massive data", ACM Computing Surveys (CSUR), vol. 33, Issue 2, Jun. 2001, pp. 209-271.

(Continued)

*Primary Examiner* — Sana Al Hashemi
(74) *Attorney, Agent, or Firm* — L. Alan Collins; Collins & Collins Intellectual, LLC

(57) ABSTRACT

A computer-implemented sorting method for efficiently sorting large data sets in computing environments that include virtual memory and processor caching, the method including determining available physical memory, identifying portions of the data set that each fit in the available physical memory, determining available cache, identifying sub-portions within the portions that each fit in the available cache, sorting each sub-portion, repeating the identifying portions, identifying sub-portions, and sorting for each portion of the data set, and merging the sorted sub-portions and portions such that the data set is sorted. The sorting method avoids the use of virtual memory and seeks to identify sub-portions that fit in available cache.

20 Claims, 3 Drawing Sheets

U.S. PATENT DOCUMENTS

2007/0266062 A1 11/2007 Young
2008/0168111 A1 7/2008 Lyon
2008/0208933 A1 8/2008 Lyon

OTHER PUBLICATIONS

Rafiqul Islam et al., "A new external sorting algorithm with no additional disk space", Information Processing Letters, vol. 86, Issue 5, Jun. 2003, pp. 229-233.

C. Nyberg et al., "AlphaSort: a cache-sensitive parallel external sort", VLDN Journal 4 (4), 1995, pp. 603-627.

Net Integration Technologies Inc., "Intelligent disk backup", retrieved from http://www.nitix.com/technologies/technologies_idb.php on Dec. 23, 2005.

Veritas Software Corp. and Network Appliance Inc., "Optimizing Data Protection with Veritas and Network Appliance", Copyright 2005, http://www.netapp.com/ftp/vrts-data-protection.pdf.

Knuth, "The Art of Computer Programming vol. 3: Sorting and Searching", Addison-Wesley, 1973.

Lyon, "Multi-Client Cluster-Based Back Up and Restore", U.S. Appl. No. 11/407,798, filed Apr. 20, 2006.

Nyberg, "AiphaSort: A RISC Machine Sort", Proceedings of the 1994 ACM SIGMOD International Conference on Management of Data, May 24-27, 1994.

Lyon, "Multi-Client Cluster-Based Backup and Restore", U.S. Appl. No. 12/039,717, filed Feb. 23, 2006.

Lyon, "Multi-Client Cluster-Based Backup and Restore", U.S. Appl. No. 12/041,643, filed Mar. 3, 2008.

* cited by examiner

SORTING LARGE DATA SETS

TECHNICAL FIELD

This description relates generally to computerized sorting and more specifically to sorting large data sets in computing environments including a CPU cache and virtual memory system.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention provides technology for the efficient sorting of large data sets in computing environments including a CPU cache and virtual memory system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present invention and is not intended to represent the only forms in which the present invention may be constructed or utilized. The description sets forth the example functions of the invention and the sequence of steps for constructing and operating the invention. However, the same or equivalent functions and sequences may be accomplished by different examples.

Although the present invention is described and illustrated herein as being implemented in a computing environment, the environment described is provided as an example and not a limitation. As those skilled in the art will appreciate, the present invention is suitable for application in a variety of different types of computing environments.

Figure 1:
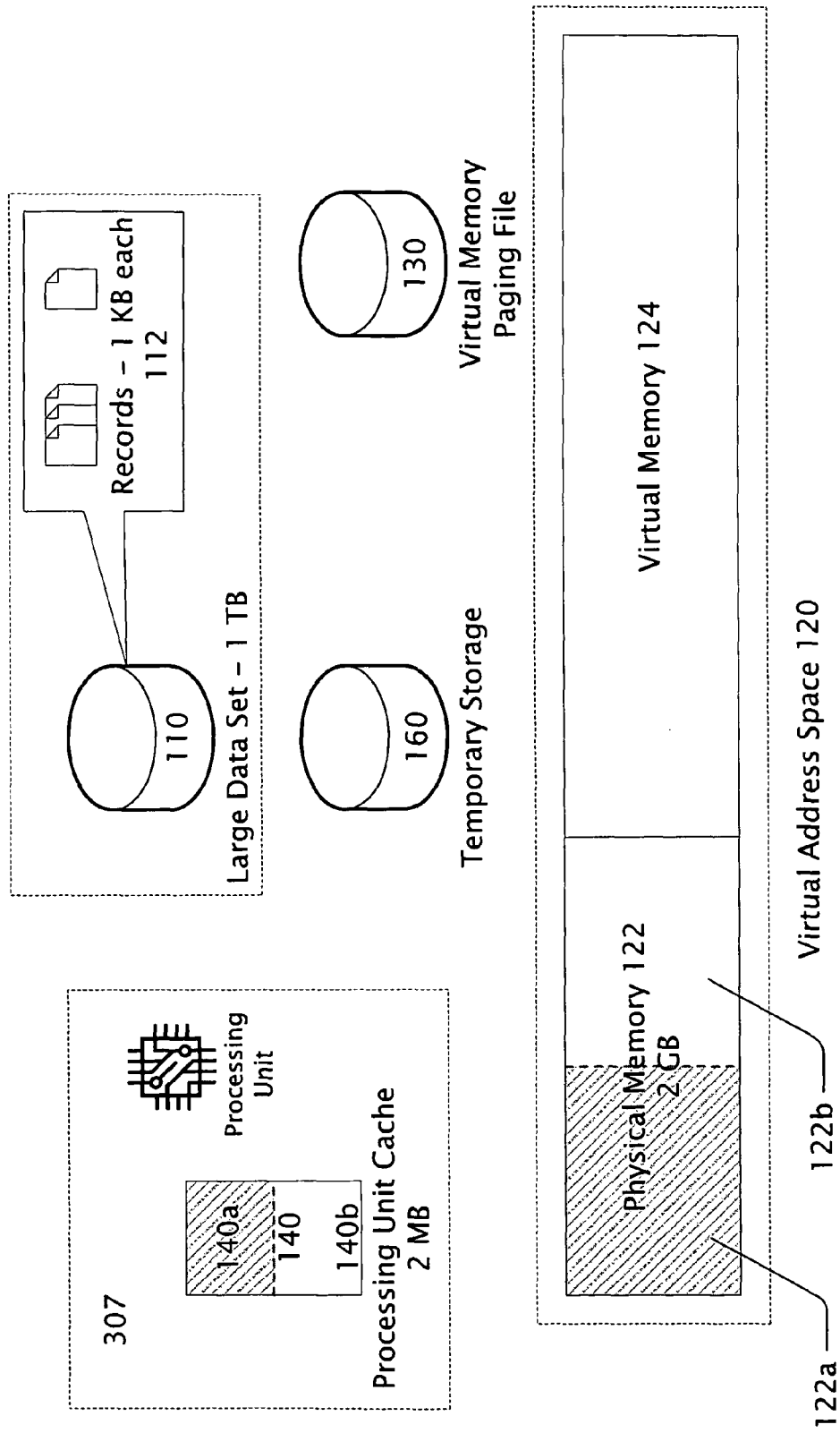
FIG. 1 is a block diagram showing some of the major elements of a typical computing environment for performing the present invention.

FIG. 1 is a block diagram showing some of the major elements of a typical computing environment for performing the present invention. Large data set 110 represents the data to be sorted. In the example in FIG. 1, large data set 140 is shown to be 1 terabyte (1 TB) in size for clarity of discussion. In practice large data set 140 may be any size. Such a large data set is typically composed of a plurality of records 112. For clarity of discussion, each record is shown to be 1 kilobyte (1 KB) in size. In practice, the records may be any size and may vary from one another in size. In one example, records of a particular cluster-based backup system are 40 bytes in size.

Figure 3:
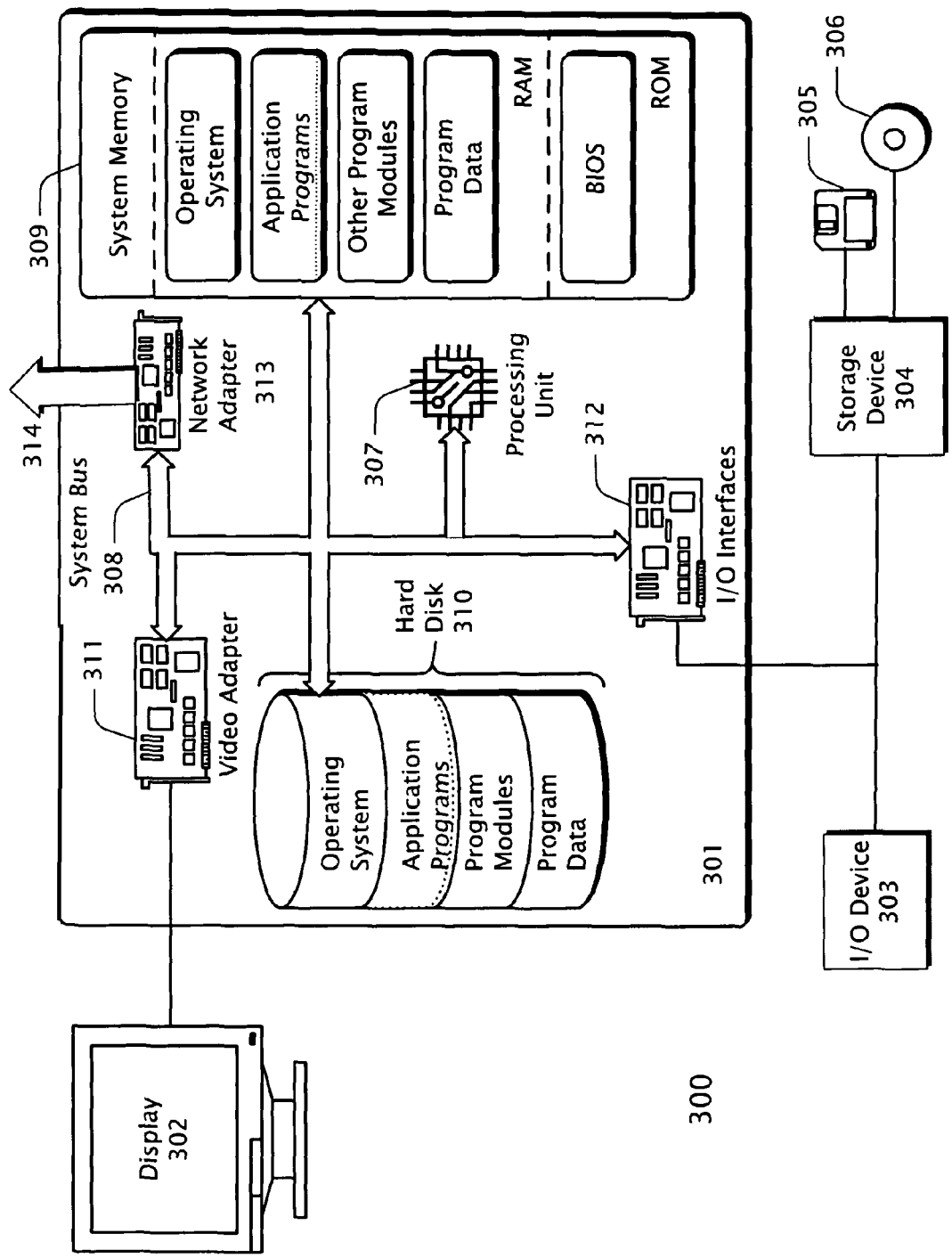
FIG. 3 is a block diagram showing an exemplary computing environment in which the technology described herein may be implemented.

An example computing environment is shown in FIG. 3. Other environments may also be used to perform the present invention. In addition to the description of the example computing environment provided in connection with FIG. 3, further detail is provided in connection with the elements of FIG. 1. Specifically, physical memory 122 is the memory hardware or "real" memory and stands in contrast to virtual memory 124. Physical memory 122 is shown in this example to be 2 gigabytes (2 GB) is size for clarity of discussion, but it could be any size in practice. One example of physical memory 122 is random access memory ("RAM") described below in connection with FIG. 3, typically considered part of system memory (FIG. 3, 309). With respect to the present invention, the term physical memory is used to describe the RAM (or "regular RAM" as opposed to "cache RAM") or the like that is typically part of system memory (FIG. 3, 309). Also, with respect to the present invention, processing unit cache 140 ("cache" or "processor cache" typically comprised of cache RAM or the like) is typically random access memory ("RAM") that processing unit 307 ("CPU") can generally access more quickly than it can access regular RAM (such as physical memory 122), typically because cache 140 is more tightly coupled to CPU 307, such as by being physically a part of CPU 307, its packaging, or the like.

Virtual address space 120 represents the total memory space available to a program operating in the computing environment. Typically, virtual address space 120 is significantly larger than the physical memory 122 available in the computing environment. Virtual address space 120 typically includes physical memory 122 of the computing environment plus virtual memory 124. While virtual address space 120 and virtual memory 124 are not elements of the present invention, a basic understanding of how a virtual address space and virtual memory operate aids in understanding the present invention. A brief discussion of the operation of a virtual address space and virtual memory is provided below.

Example CPU 307 is shown to include cache 140. In the example in FIG. 1, cache 140 is shown to be 2 megabytes (2 MBs) in size for clarity of discussion. In practice cache 140 may be any size, but the present invention typically provides greater benefit when the size of cache 140 is smaller than the available physical memory 122 of the computing environment. In other examples, a CPU may include multiple caches, pipelined caches, internal or external caches, layered caches, or the like. The present invention may be performed using CPUs with these various types of caches as well as any other type of cache. The present invention may also be performed in computing environments with multiple CPUs, distributed CPUs, or the like.

Temporary storage 160 is used by the present invention to temporarily store portions of large data set 110 as the portions are being sorted. Use of temporary storage 160 is described in more detail below. Temporary storage 160 may be any type of storage device, such as a mass storage device, a disk drive, or the like. Example storage devices are described below as mass storage devices in connection with FIG. 3. Other storage devices may also be used for temporary storage 160 as well. In general, a suitable storage device should have sufficient storage capacity to at least store large data set 110 as well as provide high-speed access to stored data.

A typical computing environment generally provides computing resources for multiple programs, including but not limited to an operating system for the computing environment, various hardware and system drivers such as printer drivers, disk drivers, display drivers, etc., as well as applications, utilities and/or other software useful to the computing environment and its users. But a typical computing environment typically includes a limited amount of physical memory to be shared between all of these programs. In order to provide sufficient memory resources a typical computing environment may make use of a virtual address space 120 so that the total memory space available to programs is greater than the amount of physical memory 122.

A virtual memory system utilizes a virtual address space 120 to extend the capabilities of a computing environment's physical hardware. Because such an address space does not correspond one-to-one with physical memory, the virtual memory system (and the way in which the system makes virtual addresses correspond to physical memory) provides what is called "virtual memory" 124. A virtual memory system makes use of a virtual memory paging file 130 ("page file") or the like to "extend" physical memory 122. This is typically accomplished by identifying which areas of physical memory have not been recently used and then automatically copying those areas onto another storage medium, such as page file 130. This copying "frees up" the copied areas of physical memory for other use. Later, when the information copied to page file 130 is again needed in physical memory 122, the system automatically copies it back into physical memory 122, copying other information not recently used to page file 130 to make room as needed. While there are many different types of virtual memory systems, each with their own details of operation, the foregoing provides a basic description of a typically system to aid in understanding the present invention. The foregoing description is provided only as a simplified example to aid in understanding, and not as a limitation.

A common method of sorting data as quickly as possible is to load all the data into system memory and then perform the sort. The problem presented by virtual memory systems typically a part of computing environments is that much of the memory made available for such a sort may not be physical memory (which tends to be relatively fast to access) but virtual memory (which is typically provided by storage space on a disk drive or the like which tends to be relatively slow to access). Such as method may result in a sort with is relatively and unexpectedly slow.

Another aspect of sort performance in a typical computing environment is the use of a CPU cache, such as cache 140. CPU 307 is typically capable of accessing information stored in cache 140 at a much faster rate than it is capable of accessing information in physical memory 122. But cache 140 is also typically much smaller in size than physical memory 122. Thus a CPU cache is typically managed much like a virtual memory system—when the CPU reads needed data from physical memory 122 the data is also stored in cache 140 where is can be accessed more quickly the next time it is needed. When the cache is full and other data is needed from physical memory, typically the least recently used information in cache 140 is "flushed" to make room for the other data. The data that was flushed remains available in slower physical memory should it be needed again. In this fashion, data that fits in cache 140 that is being processed by CPU 307 can be accessed at the fastest rate possible for CPU 307 via cache 140. Only when data is needed that is not present in cache 140 does CPU 307 need to access the relatively slower physical memory 122. Similarly, only when data is needed that is not present in physical memory 122 is data read from the even more slowly accessed virtual memory 124 page files 130.

In the example in FIG. 1, physical memory 122 is shown divided into two sections for clarity of discussion. Shaded section 122a represents the portion of physical memory in-use by portions of the operating system, currently executing programs, and the like. Section 122b represents the portion of physical memory available for use. For clarity of discussion, the used portion 122a is shown to be 1 GB is size and the available portion 122b is also shown to be 1 GB is size, each a half of the total 2 GBs of physical memory 122 shown in the example. Further, cache 140 is shown divided into two sections for clarity of discussion. Shaded section 140a represents the portion of cache currently in-use and portion 140b shows the portion available for use. For clarity of discussion, the used portion 140a is shown to be 1 MB in size and the available portion 140b is also shown to be 1 MB is size, each a half the total 2 MBs of cache 140. The total size, in-use and available amounts shown for cache 140 and physical memory 122 are strictly examples to aid in clarity of discussion and may in practice be any size or proportion.

Figure 2:
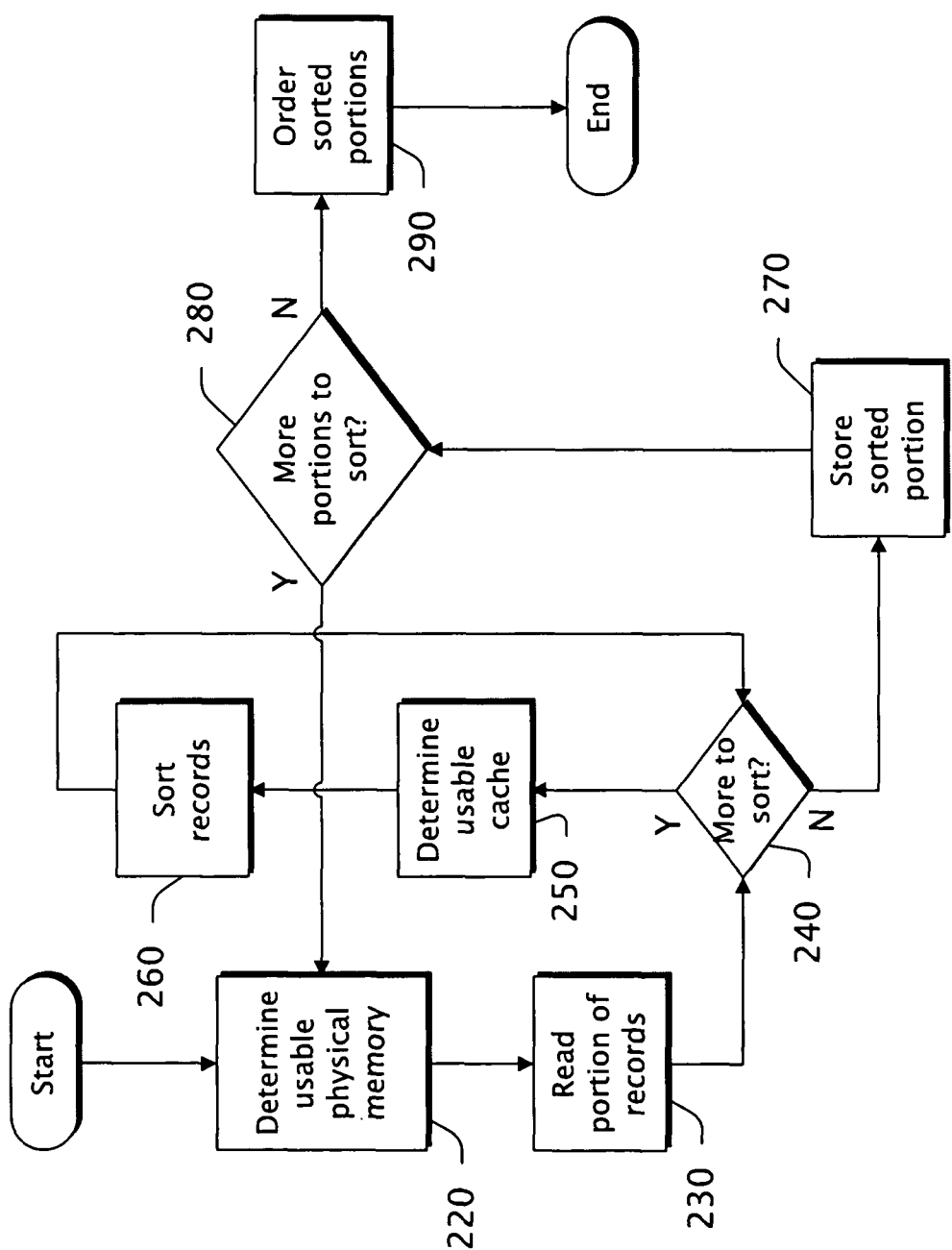
FIG. 2 is a block diagram showing the steps for performing the present invention.

FIG. 2 is a block diagram showing example steps for performing the present invention. One aspect of the present invention is to sort a large data set in the example computing environment or the like. Another aspect of the invention is to perform the sort as quickly as possible making efficient use of the cache and physical memory and avoiding slower virtual memory.

Block 220 indicates determining the amount of physical memory 122 that can be used for the sort—the usable memory ("UM"). In one example, this is done by determining the total amount of physical memory 122 and by subtracting the amount of currently-used physical memory 122a, and is the available physical memory 122b. Memory management programming interfaces or the like provided by the operating system of the computing environment typically make this information available.

Block 230 indicates reading a "portion" of large data set 110 into physical memory. In one example, the portion is determined by dividing the UM size by the record size—resulting in the number of records that are to be read as the portion. Using the example shown in FIG. 1, this is:

1,000,000 bytes usable memory/1,000 bytes per record=1,000 records in the portion such that the portion of large data set 110 read into physical memory is 1,000 records in size. In another example the portion size maybe calculated differently as in the case of records of varying size. In any case, the portion size is typically calculated so that the records in the portion fit into usable memory without requiring the use of virtual memory.

In some cases the amount of usable memory may be dynamic. For example, other programs operating in the computing environment at the same time as the sort may result in the amount of usable memory changing over time. In one example, such as change in the amount of usable memory may be ignored, potentially resulting in some sort data being swapped out to a virtual memory page file. In another example, memory management interfaces or the like may be used to reserve or lock the UM for the sort such that sort data does not get swapped out.

Block 240 indicates determining if there are any more unsorted records in the portion of large data set 110 that was read into UM. In the case of a new portion having just been read into UM, such as indicated by block 230, the process continues at block 250.

Block 250 indicates determining the amount of cache 140 that can be used for the sort—the usable cache ("UC"). In one example, this is done by determining the total amount of cache 140 and by subtracting the amount of currently-used cache 140a, and is the available cache 140b. Memory management programming interfaces or the like provided by the operating system of the computing environment typically make this information available.

Block 260 indicates performing a sort on the "group" of records 112 that will fit into the UC. In one example, a quicksort algorithm is used to do the sorting. In alternate examples, other sort algorithms may be used. By sorting only the group of records that fit in the UC, the records being sorted are accessed from within the cache 140 (once initially read by the CPU), typically resulting in a faster sort than if physical or virtual memory accesses were required. As the sorting of records in the UC is completed, the group of sorted records is reflected in UM through the normal operation of cache 140.

Once again, block 240 indicates determining if there are any more unsorted records in the portion of large data set 110 that was read into UM. When all records have been sorted in groups as described above in connection with block 260, then the process continues at block 270. In one example, for each group of records sorted in UC, a new value for the size of UC may be calculated, as shown by the progress from block 240 to block 250 to block 260. In another example, the originally calculated value for UC may be used for sorting each group of records.

Block 270 indicates storing the portion now containing sorted groups to temporary storage 160. In one example, a merge sort is used to order the sorted groups of records such that the entire portion is sorted when it is stored. In another example, another mechanism is used to order the sorted groups of records of the portion as they are stored in temporary storage 160.

Block 280 indicates determining if there are more portions in large data set 100 to be sorted. If so, then the process continues at block 220 again. In one example, for each portion being sorted, a new value for the size of UM may be calculated, as shown by the progress from block 280 to block 220. In another example, the originally calculated value for UM may be used for sorting each portion of the large data set 110 and the process continues at block 230. If all portions of large data set 110 have been sorted, then the process continues at block 290.

Block 290 indicates ordering all the sorted portions of the large data set 110. In one example, this is done using a merge-sort while the data set is being stored in its fully sorted form.

FIG. 3 is a block diagram showing an exemplary computing environment 300 in which the technology described herein may be implemented. A suitable computing environment may be implemented with numerous general purpose or special purpose systems. Examples of well known systems may include, but are not limited to, personal computers ("PC"), hand-held or laptop devices, microprocessor-based systems, multiprocessor systems, servers, workstations, consumer electronic devices, set-top boxes, and the like.

Computing environment 300 generally includes a general-purpose computing system in the form of a computing device 301 coupled to various peripheral devices 302, 303, 304 and the like. System 300 may couple to various input devices 303, including keyboards and pointing devices, such as a mouse or trackball, via one or more I/O interfaces 312. The components of computing device 301 may include one or more processors (including central processing units ("CPU"), graphics processing units ("GPU"), microprocessors ("uP"), and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus. Such mass storage devices 304 and 310 may include a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored on the hard disk 310, other storage devices 304, 305, 306 and system memory 309 (typically limited by available space) including, by way of example, operating systems, application programs, data files, directory structures, and computer-executable instructions.

Output devices, such as display device 302, may be coupled to the computing device 301 via an interface, such as a video adapter 311. Other types of output devices may include printers, audio outputs, tactile devices or other sensory output mechanisms, or the like. Output devices may enable computing device 301 to interact with human operators or other machines or systems. A user may interface with computing environment 300 via any number of different input devices 303 such as a keyboard, mouse, joystick, game pad, data port, and the like. These and other input devices may be coupled to processor 307 via input/output interfaces 312 which may be coupled to system bus 308, and may be coupled by other interfaces and bus structures, such as a parallel port, game port, universal serial bus ("USB"), fire wire, infrared port, and the like.

Computing device 301 may operate in a networked environment via communications connections to one or more remote computing devices through one or more local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, communications media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method for sorting a data set, the method performed on a computing device, the method comprising:
   first processing all of a plurality of portions that make up the data set, the first processing comprising performing, for each portion of the plurality of portions, the following:
      determining usable physical memory of the computing device, where the usable physical memory is system memory of the computing device that is not virtual memory and that is also not processor cache memory, and where the usable physical memory is determined based on a total amount of the system memory that is currently in-use and a total amount of the system memory;
      reading the each portion into the determined usable physical memory, where a size of the each portion comprises a number of records of the data set that fit into the usable physical memory without requiring use of the virtual memory;
   second processing all of a plurality of sub-portions of the each portion, the second processing comprising performing, for each sub-portion of the plurality of sub-portions, the following:
      determining usable processor cache memory of a processor of the computing device, where the usable processor cache memory is determined based on a total amount of the processor cache memory that is currently in-use and a total amount of the processor cache memory;
      sorting, by the processor, the each sub-portion within the determined usable processor cache memory, where the each sub-portion fits entirely in the determined usable processor cache memory, and where the sorted sub-portion is reflected in the determined usable physical memory based on normal operations of the processor cache memory;
   merging the first-processed portions and second-processed sub-portions resulting in the entire data set being sorted where all the sorting was performed within processor cache memory and without making use of virtual memory.

2. A computing device and at least one software module together configured for performing steps for sorting a data set, the steps comprising:
   first processing all of a plurality of portions that make up the data set, the first processing comprising performing, for each portion of the plurality of portions, the following:
      determining usable physical memory of the computing device, where the usable physical memory is system memory of the computing device that is not virtual memory and that is also not processor cache memory, and where the usable physical memory is determined based on a total amount of the system memory that is currently in-use and a total amount of the system memory;
      reading the each portion into the determined usable physical memory, where a size of the each portion comprises a number of records of the data set that fit into the usable physical memory without requiring use of the virtual memory;
   second processing all of a plurality of sub-portions of the each portion, the second processing comprising performing, for each sub-portion of the plurality of sub-portions, the following:
      determining usable processor cache memory of a processor of the computing device, where the usable processor cache memory is determined based on a total amount of the processor cache memory that is currently in-use and a total amount of the processor cache memory;
      sorting, by the processor, the each sub-portion within the determined usable processor cache memory, where the each sub-portion fits entirely in the determined usable processor cache memory, and where the sorted sub-portion is reflected in the determined usable physical memory based on normal operations of the processor cache memory;
   merging the first-processed portions and second-processed sub-portions resulting in the entire data set being sorted where all the sorting was performed within processor cache memory and without making use of virtual memory.

3. At least one computer-readable media including computer-executable instructions that, when executed by a computing device, cause the computing device to perform steps for sorting a data set, the steps comprising:
  first processing all of a plurality of portions that make up the data set, the first processing comprising performing, for each portion of the plurality of portions, the following:
    determining usable physical memory of the computing device, where the usable physical memory is system memory of the computing device that is not virtual memory and that is also not processor cache memory, and where the usable physical memory is determined based on a total amount of the system memory that is currently in-use and a total amount of the system memory;
    reading the each portion into the determined usable physical memory, where a size of the each portion comprises a number of records of the data set that fit into the usable physical memory without requiring use of the virtual memory;
    second processing all of a plurality of sub-portions of the each portion, the second processing comprising performing, for each sub-portion of the plurality of sub-portions, the following:
      determining usable processor cache memory of a processor of the computing device, where the usable processor cache memory is determined based on a total amount of the processor cache memory that is currently in-use and a total amount of the processor cache memory;
      sorting, by the processor, the each sub-portion within the determined usable processor cache memory, where the each sub-portion fits entirely in the determined usable processor cache memory, and where the sorted sub-portion is reflected in the determined usable physical memory based on normal operations of the processor cache memory;
  merging the first-processed portions and second-processed sub-portions resulting in the entire data set being sorted where all the sorting was performed within processor cache memory and without making use of virtual memory.

4. The method of claim 1 where the sorting is based on a quicksort algorithm.

5. The method of claim 1 wherein the merging is performed via a merge-sort.

6. The method of claim 1 where the processor is one of a plurality of processors of the computing device.

7. The method of claim 1 where the computing device is one of a plurality of computing devices performing the method.

8. The method of claim 1 where a size of the data set is larger than a size of the determined usable physical memory.

9. The method of claim 1 where a size of the data set is larger than a size of the determined usable processor cache memory.

10. The computing device and the at least one software module of claim 2 where the sorting is based on a quicksort algorithm.

11. The computing device and the at least one software module of claim 2 where the merging is performed via a merge-sort.

12. The computing device and the at least one software module of claim 2 where the processor is one of a plurality of processors of the computing device.

13. The computing device and the at least one software module of claim 2 where the computing device is one of a plurality of computing devices performing the method.

14. The computing device and the at least one software module of claim 2 where a size of the data set is larger than a size of the determined usable physical memory.

15. The computing device and the at least one software module of claim 2 where a size of the data set is larger than a size of the determined usable processor cache memory.

16. The at least one computer-readable media of claim 3 where the sorting is based on a quicksort algorithm.

17. The at least one computer-readable media of claim 3 where the merging is performed via a merge-sort.

18. The at least one computer-readable media of claim 3 where the processor is one of a plurality of processors of the computing device.

19. The at least one computer-readable media of claim 3 where the computing device is one of a plurality of computing devices performing the method.

20. The at least one computer-readable media of claim 3 where a size of the data set is larger than a size of the determined usable physical memory, and is larger than a size of the determined usable processor cache memory.

* * * * *